United States Patent Office 2,920,034
Patented Jan. 5, 1960

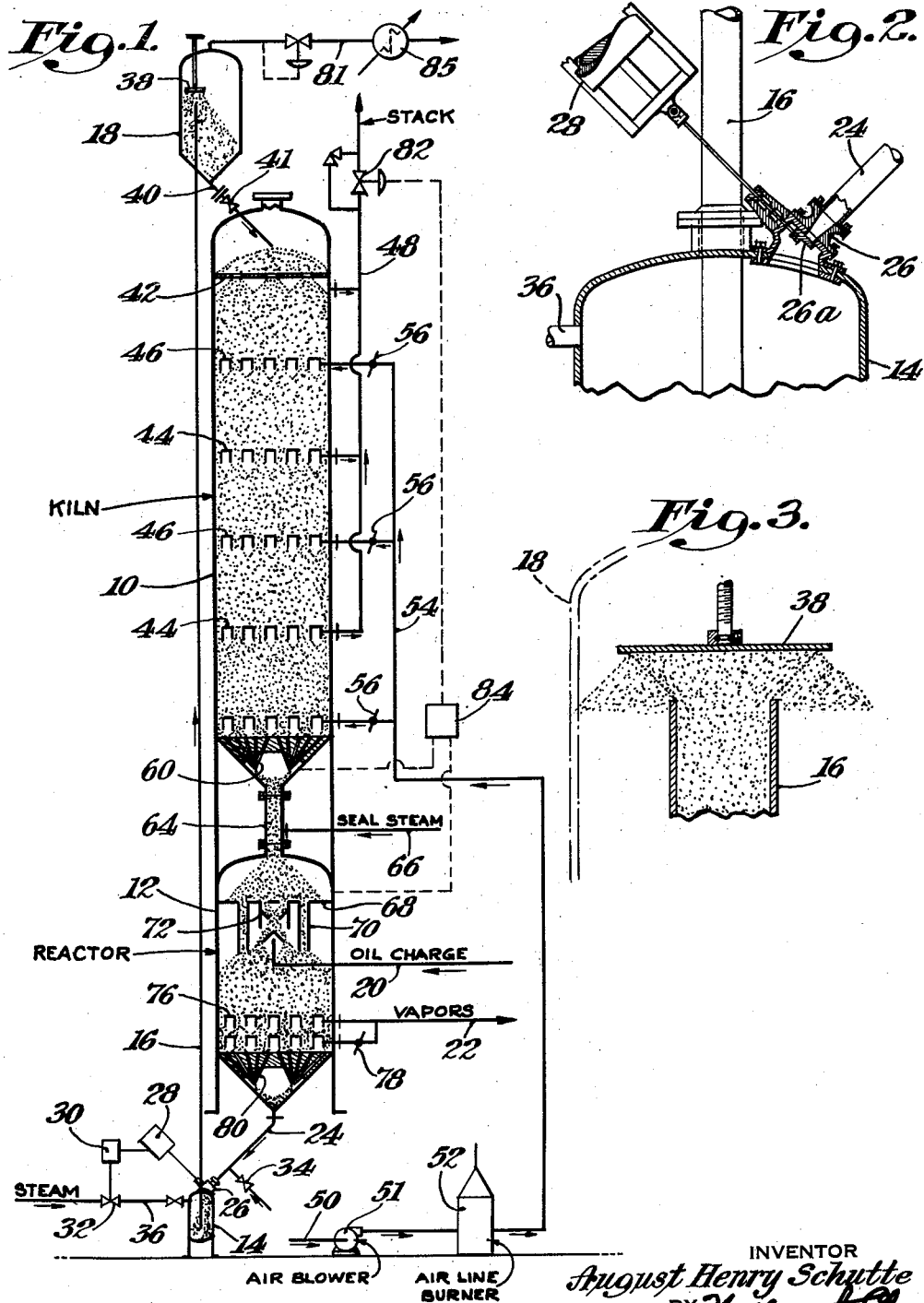

2,920,034

CONVERSION OF LIQUID HYDROCARBONS WITH THE USE OF A MOVING BED OF CATALYST PARTICLES

August H. Schutte, Hastings-on-Hudson, N.Y., assignor to The Lummus Company, New York, N.Y., a corporation of Delaware Continuation of application Serial No. 90,026, April 27, 1949, which is a continuation of application Serial No. 101,365, June 25, 1949. This application February 26, 1954, Serial No. 412,803

2 Claims. (Cl. 208—146)

This invention relates to improvements in continuous catalytic conversion, particularly the cracking of normally liquid hydrocarbons, in the presence of moving gravity packed beds of granular catalyst.

It is a continuation of my copending applications, Serial No. 90,026, filed April 27, 1949, now abandoned, and Serial No. 101,365, filed June 25, 1949, now abandoned. It is also a continuation-in-part of my copending application Serial No. 107,458, filed July 29, 1949, now U.S. Patent No. 2,684,929.

In the continuous conversion of hydrocarbons by catalytic cracking, large quantities of catalyst are transferred between zones at different pressures and at different vertical elevations. In one of these systems, generally known as the "fluid" system, the catalyst is in a fine dust-like size of the order of 100 to 200 mesh and for circulation, the aerated manometric technique has been developed.

The other of the most commonly used present day catalytic cracking processes uses the continuously moving gravity packed bed of particulate solids and this is considered to have some advantages over the so-called "fluid" system. There have been some disadvantages however and these include the cost of elevating the materials from the lower to the upper part of the cyclic path, the high cost of reactor feed preparation equipment which includes supplying external heat for vaporizing and superheating the charge, the cost of equipment for heat removal from the regenerator, and the costly structure required to mount the equipment at the high elevation necessary to provide adequate pressure seals between operating zones.

The designer of continuous vapor lifts for the larger particle size material which is in the range of forty mesh to half inch must limit the net upward velocity of the solids particles in order to avoid undue attrition and he must limit the percentage of solids in the lift leg in order to minimize the required pressure at the bottom of the lift leg. A high differential pressure between the vessel from which the solids material is being withdrawn and the bottom of the lift leg would require an excessively long vertical seal leg to dissipate the differential pressure while still permitting downward flow of solids into the base of the seal leg. Since non-turbulent seal legs for particulate solids require about five feet of height to overcome one pound per square inch differential pressure, it follows that a 10 pound differential pressure across the solids inlet to the seal leg will require a fifty foot vertical height for the seal leg. This in turn means that the bottom outlet of the lowest process vessel must be at least fifty feet above grade. This not only increases the vertical height through which the solids must be elevated but also increases the overall height of the process unit and adversely affects the design of the supporting and structural members. The above difficulties are multiplied to an absurd degree when bottom lift leg pressures of 20 to 80 pounds per square inch are required for operation in conjunction with reaction vessels operating at approximately five pounds per square inch.

The result of the above limitations is that the vapor lift for commercial units has been designed for a low bottom pressure in the order of five to ten pounds per square inch gauge. Since the bottom pressure must be greater than the weight of the vertical column in transport, it is necessary with conventional designs to use a low solids loading or low percent of solids per cubic foot, in the lift leg.

The principal object of my invention is to materially reduce the equipment cost of a continuous catalytic cracking unit using granular catalyst without loss of efficiency or control and specifically to eliminate all outside fired heaters, mechanical elevators and most all of the heat exchange units heretofore thought necessary for catalyst regeneration control. In other words, by a modification of the catalyst recirculation rate which can be accomplished by a simplified catalyst lift, I can reduce kiln temperatures without intermediate cooling and I can apply liquid oil charge to the moving catalyst and thereby supply all the heat necessary for vaporization and conversion of the charge. Overall economies are thereby of a very substantial order.

In accordance with a preferred form of embodiment of my invention, Fig. 1 of the drawing diagrammatically illustrates, in elevation, with parts in vertical section, a continuous catalytic cracking system.

Fig. 2 is an enlarged vertical cross section of the bottom lift leg showing the inlet control device.

Fig. 3 is an enlarged vertical section of the upper end of the lift leg and associated parts.

In general the system includes the primary elements including the kiln or regenerator 10, the reactor 12, the lower catalyst transfer chamber 14, the lift leg 16 and the upper catalyst transfer chamber 18 together with the necessary communication conduits, hereinafter specifically mentioned, all of which are connected in a complete closed pressure tight circuit.

The liquid hydrocarbon charge at 20 is fed to the reactor 12 in a preheated condition although it is at a temperature substantially less than for a completely vaporized condition. The oil is directly heated by contact with the catalyst which supplies sufficient heat not only to vaporize the oil but also to supply the superheat and the endothermic conversion heat. This conversion in turn results in the formation of some carbon on the catalyst that is later burned off in the kiln or regenerator 10.

The spent catalyst is then removed through solids discharge line 24 by gravity into the catalyst transfer chamber 14 passing through valve 26 which is controlled by valve operator 28 to move the valve into the open and closed positions periodically by timer 30. The timer, in turn, also actuates steam inlet valve 32 by which a fluid pressure is applied to chamber 14 to raise the catalyst through lift leg pipe 16. Steam is used at 34 for purge and vapor stripping.

The cycle for the lifting device is as follows: catalyst transfer chamber 14 contains an inventory of solids material above the bottom of lift leg 16. With valve 26 closed, timing device 30 opens valve 32 in the lifting vapor inlet 36 and introduces high pressure lifting vapors in the order of 50 to 150 p.s.i.g. into chamber 14 at a controlled rate. As the internal pressure of chamber 14 increases, the slidable face 26a of valve 26 is driven back against its seat, effectively preventing back flow of lift vapors through line 24. The increase in pressure is accompanied by flow of vapors down through the solids bed in chamber 14 and up the lift leg 16 until sufficient pressure and velocity has been obtained to entrain and lift solids material. As this lifting action continues, the inventory in chamber 14 decreases and when the level of solids has dropped to a suitable point, but preferably before the vessel is completely evacuated of entrainable solids, timer 30 closes valve 32, shutting off the supply of lifting vapors.

With no further supply of lifting vapors the vapor flow up the lift leg 16 rapidly decreases until the pressure at the top and bottom of this leg are equalized at a pressure far lower than that prevailing during the lifting operation and essentially equal to the pressure in solids supply line 24. The timer 30 after this short delay, then opens valve 26 by actuating operating mechanism 28 in turn leaving valve 32 closed. The pressure in chamber 14 equalizes with the low pressure of approximately 5 p.s.i.g. in chamber 18. The solids material then rapidly enters the vessel 14 and fills it to a fixed height which may be conveniently set by the natural flow angle of repose of the solids material. Timer 30 then closes valve 26 and the cycle is repeated.

Valve 26 is so constructed that the movement of the slidable member in closing the conduit 24 is a movement through a free pile or cone of repose of the solids material at a setcion where the solids are free to move laterally out of the way of the slidable member. This prevents jamming of the valve mechanism, crushing the solids particles, or difficulty in valve operation due to accumulation of fines in the guiding ways (not shown) for the slide member 26a.

The mass moves as a gravity packed body up the leg, the gas velocity being less than that required to carry the particles in suspension. By gravity packed body, I mean a non-turbulent mass wherein all particles are in contact with one another and with a solids concentration of more than 20%. With the size catalyst I prefer to use, which ranges from $\frac{1}{16}''$ to $\frac{1}{2}''$, I prefer not to have superficial gas velocities in the lower part of the lift leg 16 in excess of 3 to 8 feet per second, depending on the particle diameter.

The lift leg 16 is preferably stepped or tapered from bottom to top with the largest diameter at the top to approximate the difference in gas pressure and density and to obtain a substantially uniform unit pressure drop. It is my experience that a lift leg of only 14 to 16 inches diameter at the lower end will be sufficient to move 600 tons per hour. With a lifting height of 150 feet the pressure in the bottom catalyst chamber 14 during the lifting period will be about 100 pounds' gauge. The steam requirements are then only about 5000 to 8000 pounds per hour.

This favorably compares with requirements of thirty to forty thousand pounds per hour of steam customary with a dilute phase vapor lift having a 10% solids concentration in the lift leg. It also compares very favorably with the requirements of mechanical elevators of which four would be needed, each with six foot diameter casings and of pressure tight construction adapted to handle the solids at the temperature ranges of 900° F. to 1000° F.

Within the upper chamber 18 and adjacent the lift leg outlet is an adjustable plate 38 large enough to intercept the upward cone of flow of the mass of material leaving the top of the lift leg. In operation with proper location of plate 38, flow will automatically stop when the chamber 18 is effectively full without any appreciable change in gas flowing up the lift leg. This is due to the fact that as the contact material moves upward through lift leg 16 it tends to move out of the lift leg on a submerged active flow angle at about 17° from the vertical and as the hopper fills up the cone of flow of about 45° is ultimately reached. The material flow then stops, although the gas keeps on flowing up the lift leg. This is shown in Fig. 3.

It is thus found that with the application of sufficient pressure to chamber 14 to raise the catalyst, the quantity of catalyst handled by the lift will be controlled by the rate of removal of the catalyst from the top chamber 18.

So long as the timer 30 is set so that the system is capable of delivering more material than is being drawn off from chamber 18 through line 40, the lifting device will operate to maintain the chamber 18 substantially full, and no solids level detecting or controlling device is required in chamber 14 since a minimum inventory of catalyst will always remain in this chamber at the end of each lifting cycle.

The draw off leg indicated at 40, is at a sufficiently sharp angle to permit free gravity flow into the upper part of regenerator kiln 10. The rate of catalyst circulation is controlled by the setting of valve 41 in line 40 and this may be accurately calibrated in terms of weight per hour versus valve setting, since the flow through such a valve is insensitive to the solids head above the valve when there is an upstream catalyst level equivalent to more than two pipe diameters.

Preferably a distributor baffle 42 is placed at the upper part of the kiln 10 to uniformly distribute the catalyst throughout the kiln. The kiln is also provided with suitable flue gas outlet channels 44 interconnected with a stack 48 and the air inlet channels 46 interconnected with an air source 50, air blower 51, air line burner 52 and distributor manifold 54. One or more air inlet channels may be used depending on the pressure drop with the purpose of reducing back presure on the air blower. Suitable dampers 56 will be provided.

Within the kiln 10, the catalyst particles move as a gravity packed mass of granular material with the carbon being burned off progressively by the application of the preheated air into the inlet channels 46. Assuming that the spent catalyst enters the kiln at from 850° F. to 900° F., and with the predetermined high catalyst-to-oil ratios, which may be expressed as being in the order of 600 tons per hour of catalyst circulation for a feed of 11,000 barrels per day or about 10.8 to 1, the temperature of the bed will not rise above 1050° to 1150° F. with no other heat removal than the normal removal of combustion products to the stack 48. This temperature will not damage the catalyst.

At the lower part of the kiln 10, I provide a uniform flow draw off having a plurality of flow pipes 60 discharging to a common outlet pipe 64 which is provided with sealing steam at 66 to prevent downflow of combustion products or upflow of reaction products.

The catalyst then flows by gravity into reactor 12 which may also have a distributing baffle 68. The baffle is provided with a series of downflow pipes 70 and a central oil applying and vaporizing chamber 72. The central section is also more particularly shown and described in my copending application Serial No. 69,657, filed January 7, 1949, now U.S. Patent 2,561,420. In general, the major amount of catalyst flows through the center section 72 for oil contacting and a minor amount flows through the downflow pipes 70 to automatically maintain a constant bed level in the reactor.

In the oil charge contacting zone 72 direct contact with the preheated catalyst provides the latent, superheating and endothermic heat requirements to carry on the catalytic conversion in the main reactor bed. The major portion of the catalyst circulation falls freely by gravity over the baffles in the contacting zone 72 at maximum velocity and maximum concentration and the walls and baffles defining this zone are subjected to the continuous flow and scrubbing action of the catalyst thereby preventing the accumulation of coke growth which would result in interruption of normal flow. The oil is introduced into the catalyst stream preferably in a lateral direction as by a horizontal deflector plate mounted adjacent the open end of the oil feed pipe. No spray nozzles, atomizing or distributing devices requiring small orifices are required. The high concentration of the catalyst flow and the initial foaming action at the zone of mixing of the oil and the highly preheated catalyst insures a uniform contacting between hydrocarbon charge and the catalyst.

There are some unique problems in the contacting of liquid hydrocarbon on preheated granular catalysts. Experiments and pilot plant work have shown that two different conditions can exist in the contact zone. With a liquid charge of relatively high and narrow boiling range, such as is prepared by prevaporizing the charge and separating the resulting liquid as a component for separate application to the catalyst, and with preheated catalyst temperatures of 900° to 1000° F., the heavy liquid oil is absorbed or soaked up by the catalyst. Since the liquid carrying capacity of the catalyst is great (8,000 to 10,000 barrels per day per 100 tons per hour of catalyst circulation) all the particles cannot be saturated and therefore, an uneven distribution will result. The carbon deposit will also be uneven; interfering with operation and control of regeneration and resulting in poor conversion and local catalyst overheating.

In the feed contacting method described herein, with the entire charge applied to the catalyst, the hydrocarbon has a wider boiling range and lower initial vaporization temperature. The preheated catalyst is also hotter (1050–1200° F.). It has been found in practice that this results in very rapid boiling of the oil upon initial contact with the catalyst and prevents any penetration of the particles by liquid. The vaporization is then done entirely by the outside surface of the particles and the vapors so produced are then cracked in contact with all the catalyst, in a uniform fashion.

The contacting may thus be considered as occurring in two steps: the first being a short time contact of oil charge in a vaporizing condition at a very low effective catalyst-to-oil ratio, substantially effective only on the surface of the particles. The second step is the long time vaporphase contact with catalyst in concurrent movement with a high catalyst-oil ratio.

Leaving contacting zone 72, the superheated hydrocarbon vapors in temperature equilibrium with catalyst at a temperature level suitable for subsequent catalytic conversion flow down onto the bed maintained in reactor vessel 12. The catalyst flows down through the reactor in a uniform fashion at a rate controlled by the rate of its removal from the lower outlet of the reactor by the catalyst circulation system. The vapors pass down through the bed undergoing catalytic conversion in concurrent flow with the catalyst.

Vapors released from the conversion of the oil are removed from the lower part of reactor 12 through the vapor channels 76 of which there may be one or more so arranged that vapor may be removed without entraining catalyst particles. The catalyst is uniformly removed through the flow control pipes 80 which are similar to the previously described flow control pipes 60.

Cracking catalysts for the conversion of heavy oils into gasoline are suitable combinations of active silica and alumina, silica and magnesia or mixtures of these with each other or with small amounts of other metal oxides such as zirconium oxide, thorium oxide, beryllium oxide, and fluorides, such as aluminum fluoride or magnesium fluoride or the fluosilicates of aluminum or magnesium. Silica gel mixed with active alumina or magnesia in amounts of about 2 to 30% of the latter is very effective. Activated natural earths such as fuller's earth, montmorillonite clay, bentonite, etc. and acid activated montmorillonite clay, known as Super Filtrol, are also satisfactory. In general, the process is adapted to employ well known catalysts.

Hydrocarbon vapors are removed from the spent catalyst leaving the reactor prior to their introduction into the regeneration zone by superheated steam introduced into the bottom reactor drawoff line 24 through line 34. Steam may also be introduced into the bottom of the reactor bed below the lowest vapor drawoff, in conventional fashion. The elimination of hydrocarbon vapors from the spent catalyst by counterflow of steam through the descending mass of granular catalyst particles is far more efficient than that obtained by the fluidized or turbulent contacting of powdered catalyst by steam which is obtained in the well known cracking installation of "fluid" type.

The complete removal of hydrocarbon vapors from spent catalyst is highly important in that it results in higher recovery of the valuable products of catalytic conversion and prevents the destructive burning of these materials in the regeneration zone. In the catalytic cracking system described, utilizing steam as a lifting gas, a further stripping effect and substantially complete recovery of hydrocarbon material obtained due to the depressuring effect of the lift from a pressure of 100 p.s.i.g. which ultimately drops to the pressure in the upper hopper 18 which is approximately 5 p.s.ig. A simple condenser 85 placed on the steam outlet line 81 leaving the top catalyst receiving vessel 18 will condense out the last traces of oil carried by the spent catalyst leaving the reactor stripping system.

A simplified pressure control on the system is accomplished by using a controlled damper 82 on the stack outlet 48. This in turn will be controlled by the differential pressure regulator 84 effected by the pressures in the bottom of kiln 10 and the top of reactor 12. As a result, the steam in line 66 will split, going partly into reactor 12 and partly into regenerator kiln 10, thus sealing these zones against interflow of vapors. Normally, the pressure in kiln 10 is from 5 to 15 p.s.i.g. while pressures in the reactor 12 may range from 6 p.s.i.g. at the top to 5 p.s.i.g. at the vapor drawoff.

The savings obtainable by using this new method over the conventional design are obvious. For 11,000 barrels per day of charge with reactor and kiln diameters of 19 feet the elimination of long sealing legs reduces the overall height from over 200 feet to only 145 feet. There is also no need of an oil heater, as the feed temperatures of the charge which may be in the order of 400° F. to 500° F. can be obtained by suitable indirect heat exchange from all streams. There is also no flash tower, vaporizer, or super-heater and no mechanical elevator. The system provides highly economical handling and high heat recovery. However, the high catalyst circulation rate would not be economically feasible except by the use of the improved gas lift in which the solids concentration are so greatly increased that controlled velocity of particles is possible with a minimum of attrition.

I claim:

1. A continuous process for catalytically cracking a liquid hydrocarbon in a heat balanced system and in the presence of a moving gravity packed bed of heated granular catalyst wherein the granular catalyst is transferred through an intermittently operated lift leg which comprises: introducing heated granular catalyst having a temperature of from about 1050 to 1150° F. into the top of a reaction zone as a plurality of highly concentrated free falling catalyst streams; applying the liquid hydrocarbon to the catalyst particles in at least one of said catalyst streams whereby initial foaming insures uniform contact between said hydrocarbon and the surface of the catalyst particles, said plurality of free falling streams thereafter forming a gravity packed bed within said reaction zone; uniformly moving said heated catalyst in said gravity packed bed downwardly through said reaction zone at a rate of flow whereby all of the heat required for vaporization and endothermic conversion of said liquid hydrocarbon is supplied by said heated catalyst, the weight ratio of catalyst to liquid hydrocarbon being in the order of about 10.8 to 1 such that carbon deposits on said catalyst during catalysis do not exceed 0.6% by weight; removing hydrocarbon vapors including cracked hydrocarbons from said reaction zone at a point below the application of said liquid hydrocarbon to said catalyst particles; separately withdrawing spent catalyst from said reaction zone and passing said spent catalyst to a catalyst forwarding zone as a uniformly moving gravity packed mass during the first part of a two-part catalyst transfer cycle; positively sealing said forwarding zone with respect to said reaction zone during the second part of said two-part transfer cycle; introducing inert lifting vapor to said forwarding zone during the second part of said cycle to cause said catalyst particles to move upwardly as a compact mass through a lift leg to an elevated gas release zone, the pressure of said inert lifting vapor applied to said forwarding zone being sufficient to produce a gas flow creating a pressure drop in excess of the gravitational weight of the column of catalyst in said lift leg plus the frictional resistance to the flow of the catalyst particles through said lift leg; passing said spent catalyst from said gas release zone to a regeneration zone as a uniformly moving gravity packed bed; uniformly passing said spent catalyst through said regeneration zone while subjecting said spent catalyst to an oxidizing atmosphere so as to heat the particles therein to a temperature of from about 1050 to 1150° F., said temperature being sufficient for reaction with said liquid hydrocarbons in said reaction zone but insufficient to cause catalyst destruction; and uniformly withdrawing said heated and regenerated catalyst from said regeneration zone and passing said withdrawn catalyst to said reaction zone thereby completing a closed circuit of catalyst flow, said regeneraion zone and said reaction zone being vapor sealed from one another with a vapor compatible with said liquid hydrocarbon to prevent commingling of oxidation gases and product vapors.

2. A continuous process for catalytically cracking a liquid hydrocarbon in a heat balanced system and in the presence of a moving gravity packed bed of heated granular catalyst of an average particle size of from $\frac{1}{16}$ to $\frac{1}{2}$ of an inch wherein the granular catalyst is transferred through an intermittently operated lift leg which comprises: introducing heated granular catalyst having a temperature of from about 1050 to 1200° F. into the top of reaction zone as a plurality of highly concentrated free falling catalyst streams, the particles of said streams flowing at a maximum velocity and maximum concentration; applying the liquid hydrocarbon to the catalyst particles in at least one of said catalyst streams whereby initial foaming insures uniform contact between said hydrocarbon and the surface of the catalyst particles with minimum of penetration by said hydrocarbon in said particles, said plurality of free falling streams thereafter forming a gravity packed bed within said reaction zone; uniformly moving said heated catalyst in said gravtiy packed bed downwardly through said reaction zone at a rate of flow whereby all of the heat required for vaporization and endothermic conversion of said liquid hydrocarbon is supplied by said heated catalyst, the weight ratio of catalyst to liquid hydrocarbon being in the order of about 10.8 to 1 such that carbon deposits on said catalyst during catalysis do not exceed 0.6% by weight; removing hydrocarbon vapors including cracked hydrocarbons from said reaction zone at a point below the application of said liquid hydrocarbon to said catalyst particles; separately withdrawing spent catalyst from said reaction zone and passing said spent catalyst to a catalyst forwarding zone as a uniformly moving gravity packed mass during the first part of a two-part catalyst transfer cycle; positively sealing said forwarding zone with respect to said reaction zone during the second part of said two-part transfer cycle; introducing inert lifting vapor to said forwarding zone during the second part of said cycle to cause said catalyst particles to move upwardly as a compact mass through a lift leg to an elevated gas release zone, the pressure of said inert lifting vapor being sufficient to cause said catalyst to rise as a substantially dense packed column of maximum solids density with a superficial gas velocity of substantially less than the terminal settling velocity of said catalyst in said vapor whereby attrition losses are substantially eliminated; passing said spent catalyst from said gas release zone to a regeneration zone as a uniformly moving gravity packed bed; uniformly passing said spent catalyst through said regeneration zone while subjecting said spent catalyst to an oxidizing atmosphere so as to heat the particles therein to a temperature of from about 1050 to 1200° F., said temperature being sufficient to catalyze the reaction of said liquid hydrocarbons in said reaction zone but insufficient to cause the destruction of the catalyst; and uniformly withdrawing said heated and regenerated catalyst from said regeneration zone and passing said withdrawn catalyst to said reaction zone thereby completing a closed circuit of catalyst flow, said regeneration zone and said reaction zone being vapor sealed from one another with a vapor compatible with said liquid hydrocarbon to prevent commingling of oxidation gases and product vapors.

References Cited in the file of this patent

UNITED STATES PATENTS

| | | |
|---|---|---|
| 2,312,230 | Belchetz | Feb. 23, 1943 |
| 2,520,146 | Houdry | Aug. 29, 1950 |
| 2,666,731 | Bergstrom | Jan. 19, 1954 |
| 2,684,870 | Berg | July 27, 1954 |
| 2,684,927 | Bergstrom | July 27, 1954 |
| 2,767,129 | Watson | Oct. 16, 1956 |